United States Patent [19]

Steussy

[11] Patent Number: 5,403,129

[45] Date of Patent: Apr. 4, 1995

[54] ADJUSTABLE CALIBRATED PIVOT-ARM STOP FOR DRILL-PRESS WORK TABLE

[76] Inventor: Richard R. Steussy, 334 Atherton Ave., Novato, Calif. 94945

[21] Appl. No.: 119,665

[22] Filed: Sep. 13, 1993

[51] Int. Cl.⁶ ............................................. B23B 47/00
[52] U.S. Cl. ................................... 408/87; 408/72 R
[58] Field of Search ................ 408/16, 72 R, 87, 91, 408/103; 33/630, 638, 640, 642; 144/253 R, 253 F, 253 J, 145 A

[56] References Cited

U.S. PATENT DOCUMENTS

| | | | |
|---|---|---|---|
| 695,980 | 3/1902 | Wilhelm | 408/91 |
| 882,440 | 3/1908 | Williams | 144/253 J |
| 1,422,971 | 7/1922 | Hanson | 144/253 R |
| 3,185,470 | 5/1965 | Zitner | 408/103 |
| 3,222,052 | 12/1965 | Freda | 408/91 |
| 5,114,283 | 5/1992 | Fulton | 408/103 |

Primary Examiner—Daniel W. Howell

[57] ABSTRACT

A basic flat table 10 is mounted on parent drill-press through holes 19 and on said table is mounted a pivot-arm stop 11 which swings from its end pivot-arm first-hole 15 at upper right-hand corner location basic table pivot-arm arc center hole 18 to allow distance from facing edge of pivot-arm stop 11 to drill-bit center 20 to vary. Distance is calibrated on a dial 13 printed on table surface 10 and used by operator to match facing edge of pivot-arm 11 to marks on dial 13. Movable end of pivot-arm 11 follows slotted arc 14 through which bolt through pivot-arm second-hole 17 secures location. Sliding stop 12 is mounted on pivot-arm 11 to establish distance from drill-bit to end of workpiece.

8 Claims, 4 Drawing Sheets

ADJUSTABLE CALIBRATED PIVOT-ARM STOP FOR DRILL-PRESS WORK TABLE

BACKGROUND

1. Field of Invention

This invention relates to drill-press work station tables, specifically to the means of holding workpieces in proper position with stops while drilling holes.

2. Discussion of Prior Art

My search has revealed no prior art in this field. Most woodworkers create their own drill-press table from plywood or related material and use clamps and blocks as stops. They then measure and move these said blocks randomly as necessary and use a tape-measure to determine the correct position. This leads to spending much wasted time and trial-and-error to get exact positioning for drilling holes.

OBJECTS AND ADVANTAGES

In addition to the object and advantage of accurately holding workpieces in the proper place without finding clamps and blocks to use, the several objects and advantages of the present invention are:

a. to calibrate position for drill-bit laterally on workpiece automatically by use of pivot-arm and dial printed at proper place on surface of table.

b. to position placement for drill-bit lengthwise on workpiece by use of sliding pivot-arm stop blocks.

c. to allow drilling of pre-determined multiple holes from edge of workpiece by use of above pivot-arm but with freedom to move along pivot-arm by removing pivot-arm stop blocks.

d. to allow drilling from edge of workpiece a distance wider than the 5" limit of the calibrated dial by removing bolt in arc-hole and pivot-arm and swinging pivot-arm to other side of drill-bit to use other side of pivot-arm as a stop and thus secure up to 9" of usable setting.

e. to allow free-hand drilling of unusually different workpieces by complete removal of pivot-arm and stop-blocks.

f. to allow easy installation on new drill-press or replacement of existing drill-press table by a simple two-bolt mounting.

Further objects and advantages are to provide an instant environment work table on new drill-presses or replacement drill-press tables with no need to custom-fit table to drill-press or add clamps and blocks.

Accuracy is built into the lateral positioning of drill-bit to workpiece by calibration of pivot-arm with said dial. And after locking in pivot-arm, lengthwise positioning is easily made with pivot-arm sliding stop-blocks. Still further objects and advantages will become apparent from a consideration of the ensuing description and drawings.

REFERENCE NUMERALS IN DRAWINGS

| | |
|---|---|
| 10 basic table | 16 pivot-arm sliding stop-block holes |
| 11 pivot-arm | |
| 12 pivot-arm sliding stop-blocks | 17 pivot-arm second-hole |
| 13 dial | 18 basic table pivot-arm arc center hole |
| 14 basic table arc-hole | |
| 15 pivot-arm first-hole | 19 mounting-bolt hole |
| | 20 pilot-hole |

DESCRIPTION

Figure 1A:
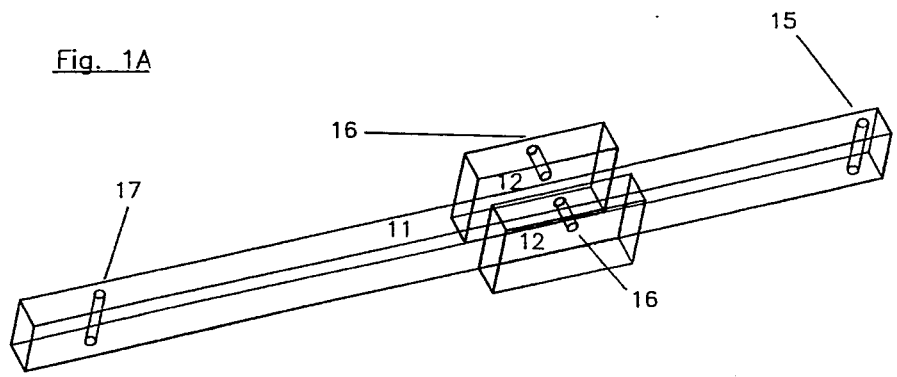
FIG. 1A and 1B show perspective drawing of complete unit with additional repeat of pivot-arm and pivot-arm sliding stop blocks to show position of holes.
Figure 1B:
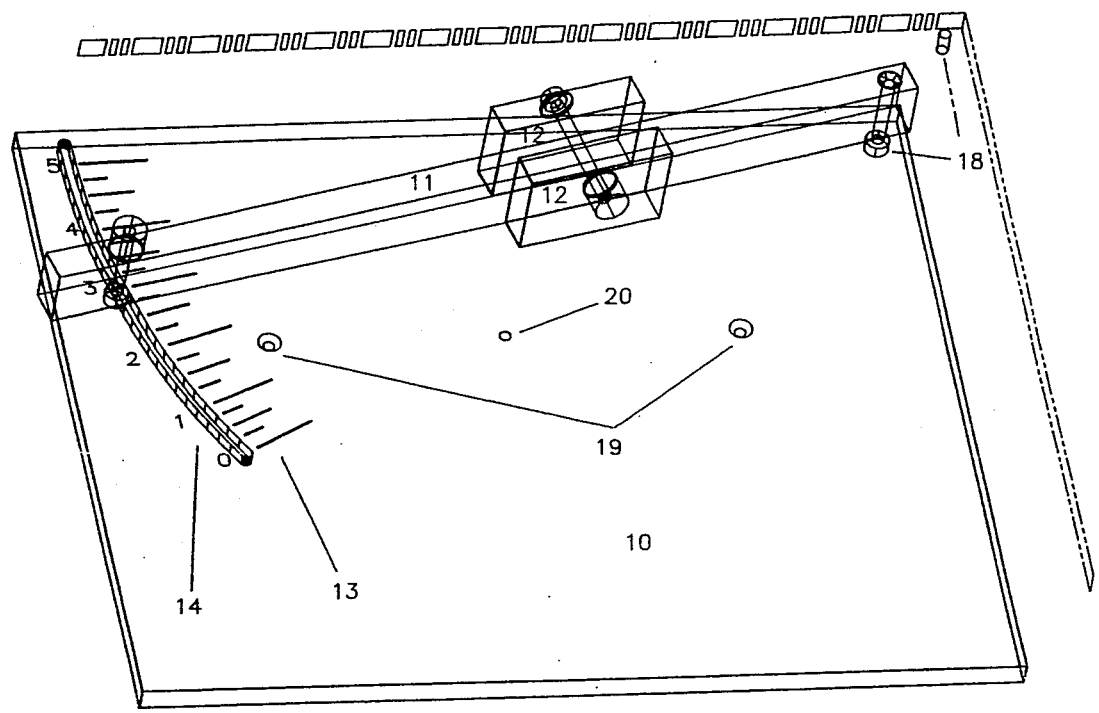

FIG. 1 is overall view of the present invention as seen in perspective. The pivot-arm 11 is mounted on basic table 10 by bolt inserted through said pivot-arm at first-hole near its end 15 from top and through basic table pivot-arm arc center hole in upper-right hand corner 18 and attached at bottom with wing-nut. The other end of said pivot-arm is attached to table by a bolt inserted through said pivot-arm second-hole 17 and basic table arc-hole 14 from bottom and fastened with wing-nut on top.

Pivot-arm slide stop blocks 12 are mounted over pivot-arm 11 and fastened with bolt through holes 16 in its sides.

Dial 13 is printed on basic table 10 and indicates distance from near edge of pivot-arm 11 to pilot-hole 20 by numbers and marks corresponding to inches and fractions.

Basic table 10 is mounted on parent drill-press steel table by means of bolts through holes 19. Calibration is made by placing ¼" dowel in drill-press chuck and matching it into pilot-hole 20 before tightening down wing-nuts under drill-press steel table.

In order to use invention, operator places workpiece on table and moves pivot-arm 11 until the desired mark on dial 13 is reached and then he tightens bolt in pivot-arm second-hole 17. This establishes lateral position of hole. To bring workpiece to proper place to drill hole a distance from end of it, loosen bolt in pivot-arm sliding stop blocks hole 16 and move to desired position and tighten. The operation takes only a few seconds. Former art required many minutes and much experimentation to get proper measurements and accurate holes.

Figure 2A:
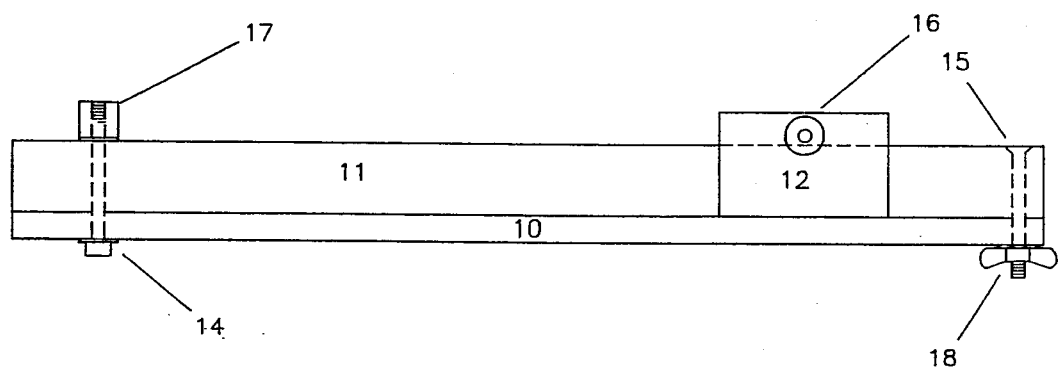
FIGS. 2A and 2B show side and top view of pivot-arm and its mounted pivot-arm sliding stop blocks.
Figure 2B:
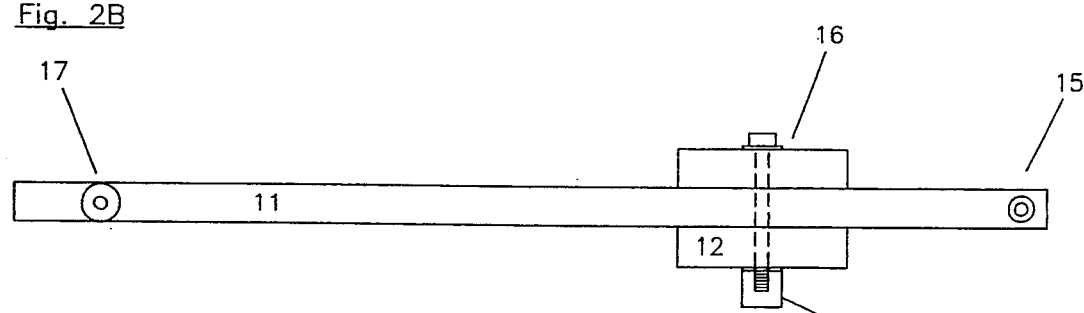

FIG. 2 gives a side view of pivot-arm 11 which is the heart of the invention. It shows how bolts fasten through pivot-arm first-hole 15 and second-hole 17. It also shows how pivot-arm sliding stops 12 are mounted to pivot-arm 11 by a bolt through holes 16.

Figure 3:
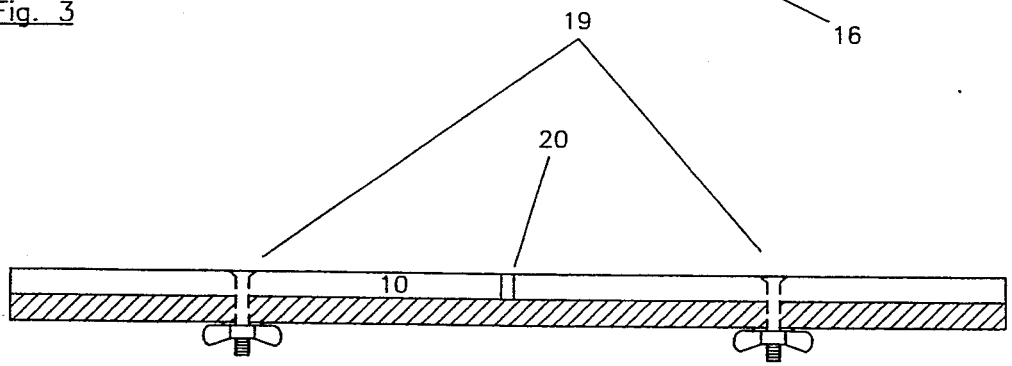
FIG. 3 shows side view of table and how it is mounted to the parent drill-press steel base.

FIG. 3 shows a side view of how basic table 10 is fastened with bolts to parent drill-press base through holes 19 with wing-nuts at bottom. It also shows pilot-hole 20. When unit is installed on drill-press, operator places ¼" dowel in drill chuck and lowers it into pilot-hole 20 to calibrate it. Then wing-nuts under holes 19 are tightened.

Figure 4:
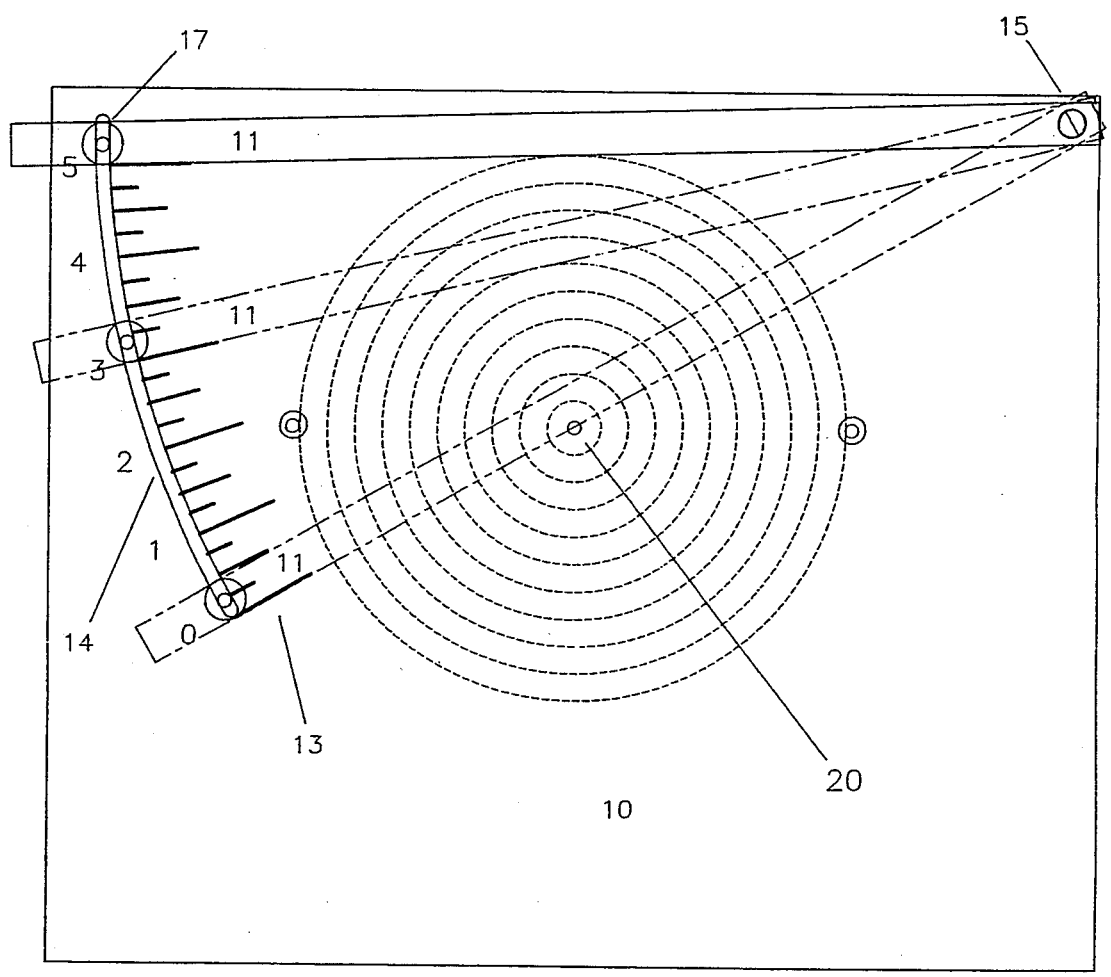
FIG. 4 shows top view of table and movement of pivot-arm when in use for lateral adjustment.

FIG. 4 shows top view of invention and indicates product in use. It shows that pivot-arm 11 swings on pivot-arm's arc center in first-hole 15 to adjust from 5 inches (position I with solid line) to 3 inches to 0 inches (next two positions with phantom lines). The dashed circles are spaced in increments of ½" from pilot-hole 20 center and illustrate that when pivot-arm is on 3 on dial 13, which is calibrated in ¼" segments, the edge of pivot-arm is also on 3".

This feature does away with using tape-measures to find proper place to drill holes in workpieces from edge. Also the pivot-arm with fasteners on both ends does away with old-style blocks held by clamps and guessing with trial-and-error operations.

Should the work require a greater than 5" distance from drill-bit center to workpiece, bolt in second-hole 17 which also goes through arc-hole 14 can be removed to allow the pivot-arm 11 to swing to the other side of drill-bit pilot-hole 20, and this allows up to 9" of distance between pilot-hole center 20 and opposing face of pivot-arm 11.

Figure 5:
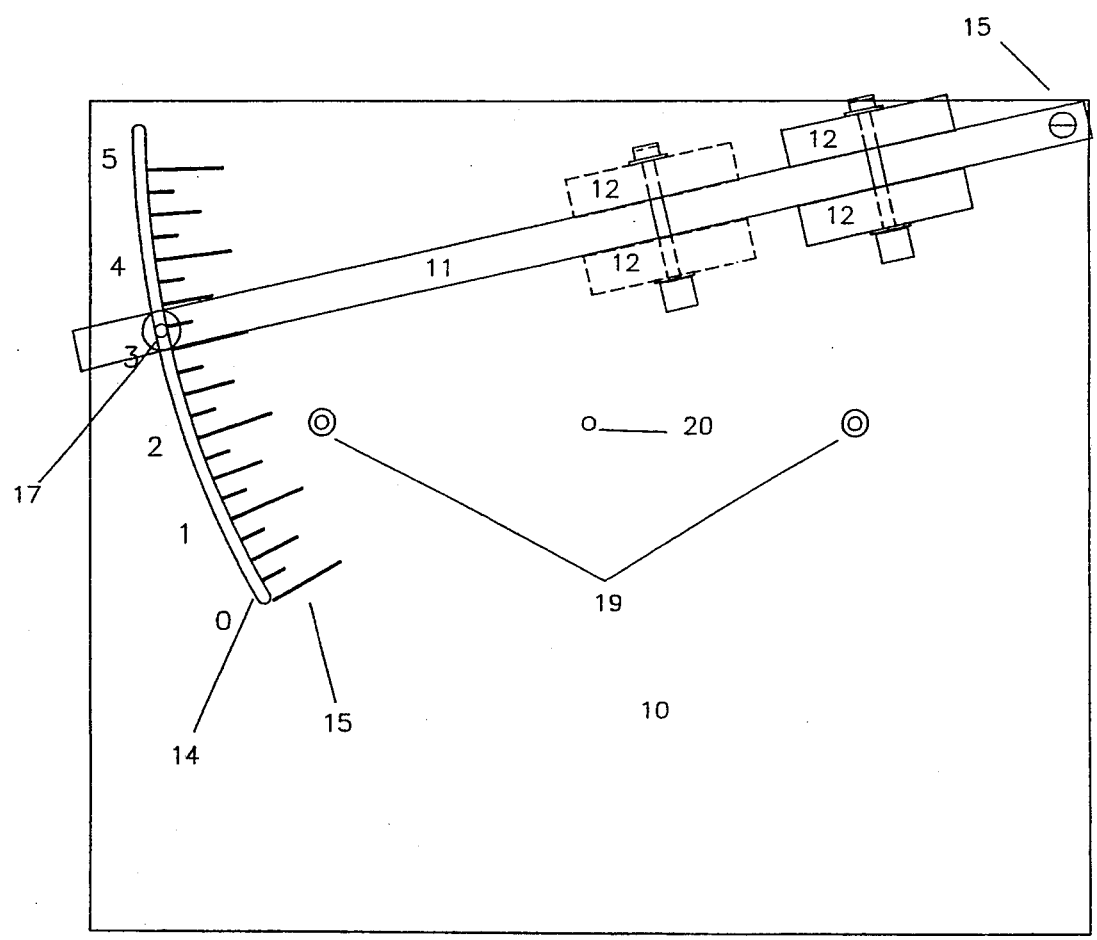
FIG. 5 shows top view of table and adjustment of pivot-arm sliding stop blocks for lengthwise adjustment.

FIG. 5 is a top view of invention showing operation of pivot-arm sliding stop-blocks 12. Phantom-lined copy of said stop-block 12 shows how it can be adjusted along pivot-arm 11 to get location of holes from end of workpiece. The setting secured by the stop-blocks 12 together with the lateral setting of the pivot-arm, make it easy to get both settings necessary to drill an accurate hole at the proper location on a workpiece. Again, this is done without use of clamps, loose stop blocks or tape measures which is what the old method required.

SUMMARY, RAMIFICATIONS AND SCOPE

You will see from the above that when an operator formerly used his drill-press, he first had to secure blocks, clamps and tape-measures to position his workpiece in the proper place. In addition, he had to fashion his table to fit on a drill-press which wasn't designed for woodworkers. This invention is designed to either replace the present makeshift table on an owner's drill-press or be installed on a new drill-press.

Instead of struggling with measuring, the operator simply moves the pivot-arm to the proper place on the dial. Instead of placing a second stop block to get the distance from end of workpiece, the operator simply loosens and moves the pivot-arm stop-blocks to the proper location.

Any possible limitations the pivot-arm or sliding stop blocks present can be eliminated as both can be removed completely and the table used for free-hand operation.

Although the description above contains many specifications, is should not be construed as limiting the scope of the invention. For example, the unit could be used by machinists, patternmakers, hobbyists, etc., as well as by woodworkers. It could be used on router tables, table-saw and band-saw tables or any other work-station where the workpiece is brought to the machine. It could be made out of any type material which is flat. The dimensions could be larger or smaller and the fasteners could differ.

Thus the scope of the invention should be determined by the appended claims and their legal equivalents, rather than by the examples given.

I claim:

1. On a rectangular surface of a table for use with a drill-press and located adjacent to the drill-press column, the improvement comprising a movable pivot-arm stop fastened to said table near one end by a first bolt through a first-hole and adjusted by a second bolt inserted through a second-hole in said pivot-arm a set distance from said first-hole, said second bolt riding in a slotted arc-hole in said table at the location of said second-hole, said pivot-arm stop for adjustment and calibration relative to a pilot-hole in said table at a drill-bit center, and a dial located adjacent to said slotted-arc hole.

2. The device of claim 1 wherein said pilot- hole is drilled through the table at a set distance from the edge of said table nearest said drill-press column.

3. The device of claim 1 wherein the first bolt fastening the pivot-arm is located in a corner of said table.

4. The device of claim 3 wherein the pivot-arm swings freely on said first bolt in said first-hole said first hole being the pivot center thereby allowing differing distances from the pivot-arm face to the center of the pilot-hole.

5. The device of claim 1 wherein said slotted arc-hole is routed into the table on the arc of said pivot-arm at same distance from the first-hole as the second-hole.

6. The device of claim 1 wherein said dial is calibrated from 0"-5" in numbers corresponding to ¼" gradations.

7. The device of claim 1 wherein a sliding stop is mounted on the pivot-arm and can be adjusted along the full length of the pivot-arm.

8. The device of claim 7 wherein said sliding stop has means clamping it to the pivot-arm.

* * * * *